(12) United States Patent
Schorn et al.

(10) Patent No.: US 12,743,620 B2
(45) Date of Patent: Sep. 22, 2026

(54) PREDICTING SOUND PLEASANTNESS USING REGRESSION PREDICTION MACHINE LEARNING MODEL

(71) Applicant: Robert Bosch GmbH, Stuttgart (DE)

(72) Inventors: Felix Schorn, Renningen (DE); Florian Lang, Ludwigsburg (DE); Thomas Alber, Filderstadt (DE); Michael Kuka, Waiblingen (DE); Carine Au, Stuttgart (DE); Filipe J. Cabrita Condessa, Pittsburgh, PA (US); Rizal Zaini Ahmad Fathony, Kemuning (ID)

(73) Assignee: Robert Bosch GmbH (DE)

( * ) Notice: Subject to any disclaimer, the term of this patent is extended or adjusted under 35 U.S.C. 154(b) by 997 days.

(21) Appl. No.: 17/977,574

(22) Filed: Oct. 31, 2022

(65) Prior Publication Data

US 2024/0143994 A1 May 2, 2024

(51) Int. Cl.
*G06N 3/08* (2023.01)
*H04R 1/08* (2006.01)

(52) U.S. Cl.
CPC ................. *G06N 3/08* (2013.01); *H04R 1/08* (2013.01)

(58) Field of Classification Search
CPC . G06N 3/08; G06N 20/00; H04R 1/08; G10L 25/51; G10L 25/27; G10L 25/30
See application file for complete search history.

(56) References Cited

U.S. PATENT DOCUMENTS 12,374,095 B2* 7/2025 Taniai ................ G06V 10/7715
2019/0325860 A1* 10/2019 Faubel .................... G10L 15/16
2021/0407490 A1* 12/2021 Cardoso ........... G10K 11/17823
2022/0270588 A1* 8/2022 Park .......................... G06N 3/08
2023/0056955 A1* 2/2023 Yao ...................... G06N 3/0455
2023/0245674 A1* 8/2023 Serra ....................... G10L 25/30 704/200

(Continued)

FOREIGN PATENT DOCUMENTS

JP 2005037559 A * 2/2005
WO 2021259842 A1 12/2021

OTHER PUBLICATIONS

Valentini-Botinhao et al. ("Predicting pairwise preferences between TTS audio stimuli using parallel ratings data and anti-symmetric twin neural networks", Sep. 22, 2022, Division of Speech, Music and Hearing) (Year: 2022).*

(Continued)

*Primary Examiner* — Imad Kassim
(74) *Attorney, Agent, or Firm* — Dickinson Wright PLLC

(57) ABSTRACT

Machine learning is used to predict a pleasantness of a sound emitted from a device. A plurality of pleasantness ratings from human jurors are received, each pleasantness rating corresponding to a respective one of a plurality of sounds emitted by one or more devices. A microphone system detects a plurality of measurable sound qualities (e.g., loudness, tonality, sharpness, etc.) of these rated sounds. A regression prediction model is trained based on the jury pleasantness ratings and the corresponding measurable sound qualities. Then, the microphone system detects measurable sound qualities of an unrated sound that has not been rated by the jury. The trained regression prediction model is executed on the measurable sound quality of the unrated sound to yield a predicted pleasantness of the unrated sound.

14 Claims, 10 Drawing Sheets

(56) References Cited

U.S. PATENT DOCUMENTS

2023/0282188 A1* 9/2023 Li ........................ G10H 1/0008
84/645

OTHER PUBLICATIONS

Tim Holzhauser et al. "Vermeidung von Over tting bei der Vorhersage von subjektiven Tonalitatsbewertungen auf Basis kunstlicher neuronaler Netze mit kleinen Trainingsmengen." English Machine Translation by Google of Title "Avoiding overfitting when predicting subjective ones Tonality assessments based on artificial neural networks with small Workout Blending." Chair of Acoustics and Haptics 2020, Machine Translation by Google attached to Original, All together 8 Pages.

Wicklin, "Pairwise comparisons of a data vector", 2014 (Year: 2014).

* cited by examiner

| Comparison Pairs | X & 1 | X & 2 | X & 3 | X & 4 | ... | X & n-2 | X & n-1 | X & n |
|---|---|---|---|---|---|---|---|---|
| Known Rating Of The Comparison Partner (e.g. On A Scale 0-10) | 0.81 | 1.09 | 1.14 | 1.62 | | 9.23 | 9.54 | 9.61 |
| Model Prediction | 0.02 | 0.05 | 0.12 | 0.12 | | 0.94 | 0.96 | 0.99 |

| | Sound 1 | Sound 2 | Sound 3 | Sound 4 | Sound 5 | Sound 6 | Sound 7 |
|---|---|---|---|---|---|---|---|
| Sound 1 | - | 0.56 | 0.75 | 0.33 | 0.91 | 0.61 | 0.52 |
| Sound 2 | 0.44 | - | 0.12 | 0.31 | 0.54 | 0.82 | 0.78 |
| Sound 3 | 0.25 | 0.88 | - | 0.9 | 0.51 | 0.38 | 0.29 |
| Sound 4 | 0.66 | 0.69 | 0.1 | - | 0.75 | 0.45 | 0.33 |
| Sound 5 | 0.09 | 0.46 | 0.49 | 0.25 | - | 0.6 | 0.8 |
| Sound 6 | 0.39 | 0.18 | 0.62 | 0.55 | 0.4 | - | 0.7 |
| Sound 7 | 0.48 | 0.22 | 0.71 | 0.67 | 0.2 | 0.3 | - |

| | Sound 1 | Sound 2 | Sound 3 | Sound 4 | Sound 5 | Sound 6 | Sound 7 |
|---|---|---|---|---|---|---|---|
| Sound 1 | - | 1 | 1 | 0 | 1 | 1 | 1 |
| Sound 2 | 0 | - | 0 | 0 | 1 | 1 | 1 |
| Sound 3 | 0 | 1 | - | 1 | 1 | 0 | 0 |
| Sound 4 | 1 | 1 | 0 | - | 0 | 0 | 0 |
| Sound 5 | 0 | 0 | 0 | 0 | - | 1 | 1 |
| Sound 6 | 0 | 0 | 1 | 1 | 0 | - | 1 |
| Sound 7 | 0 | 0 | 1 | 1 | 0 | 0 | - |

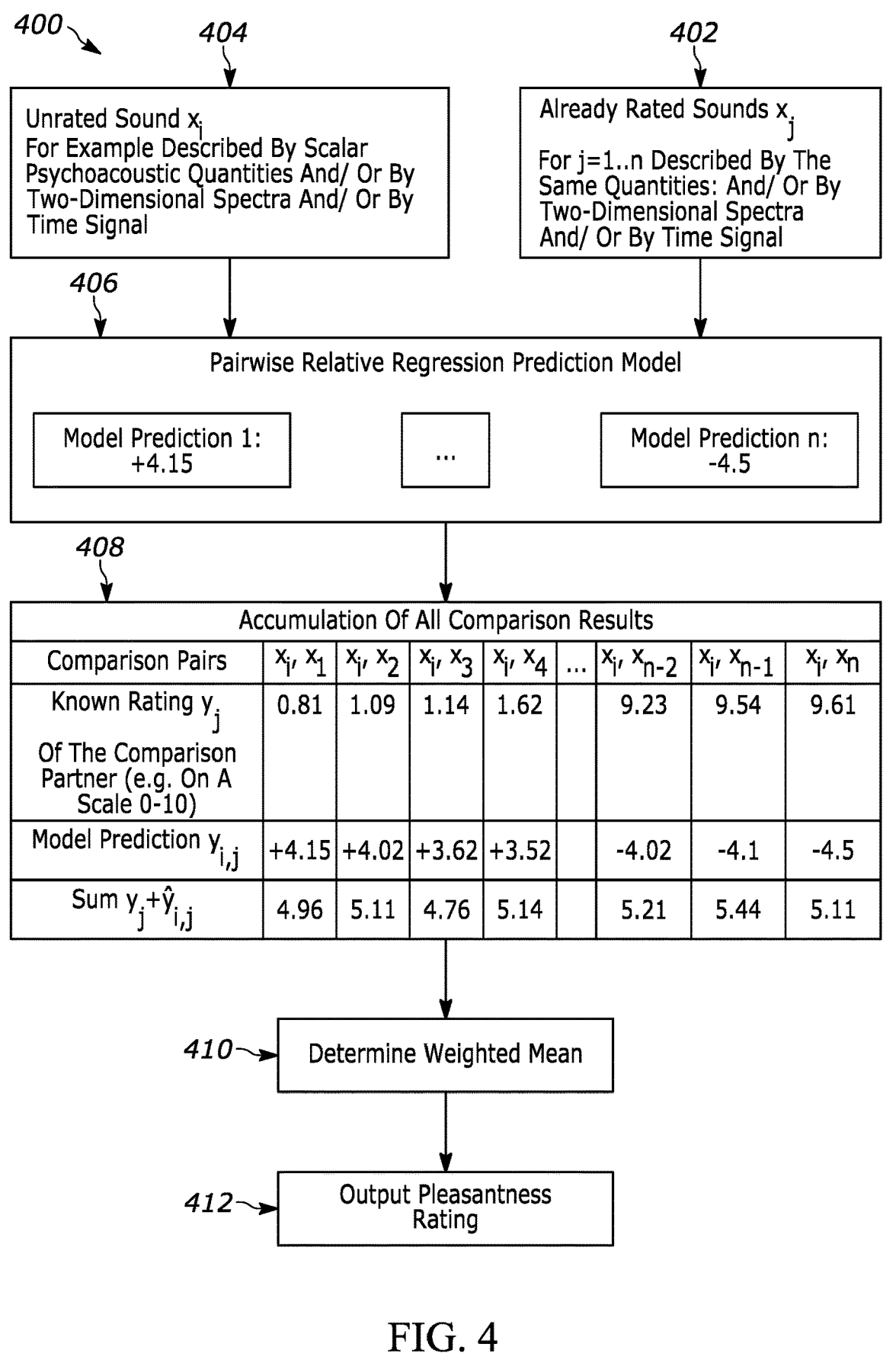

400

404

Unrated Sound $x_i$
For Example Described By Scalar Psychoacoustic Quantities And/ Or By Two-Dimensional Spectra And/ Or By Time Signal

402

Already Rated Sounds $x_j$
For j=1..n Described By The Same Quantities: And/ Or By Two-Dimensional Spectra And/ Or By Time Signal

406

Pairwise Relative Regression Prediction Model

Model Prediction 1: +4.15

...

Model Prediction n: -4.5

408

| Accumulation Of All Comparison Results | | | | | | | | |
|---|---|---|---|---|---|---|---|---|
| Comparison Pairs | $x_i, x_1$ | $x_i, x_2$ | $x_i, x_3$ | $x_i, x_4$ | ... | $x_i, x_{n-2}$ | $x_i, x_{n-1}$ | $x_i, x_n$ |
| Known Rating $y_j$ Of The Comparison Partner (e.g. On A Scale 0-10) | 0.81 | 1.09 | 1.14 | 1.62 | | 9.23 | 9.54 | 9.61 |
| Model Prediction $y_{i,j}$ | +4.15 | +4.02 | +3.62 | +3.52 | | -4.02 | -4.1 | -4.5 |
| Sum $y_j+\hat{y}_{i,j}$ | 4.96 | 5.11 | 4.76 | 5.14 | | 5.21 | 5.44 | 5.11 |

410 Determine Weighted Mean

412 Output Pleasantness Rating

FIG. 4

PREDICTING SOUND PLEASANTNESS USING REGRESSION PREDICTION MACHINE LEARNING MODEL

CROSS-REFERENCE TO RELATED APPLICATIONS

The present application is related to co-pending application Ser. No. 17/977,587 filed on Oct. 31, 2022, titled "PREDICTING SOUND PLEASANTNESS USING BINARY CLASSIFICATION MODEL AND REGRESSION", the entire disclosure of which is incorporated by reference.

TECHNICAL FIELD

The present disclosure relates to using machine learning to evaluate the pleasantness of sounds emitting from objects such as electronic devices and appliances

BACKGROUND

Several domains of application require one to measure quantities that are representative of what a human listener perceives. Sound quality evaluation, for instance, studies how users perceive the quality of the sounds of industrial objects (electronic devices, cars, electrical appliances, etc.), and establishes specifications for the design of these sounds. Sound quality evaluation can refer to the evaluation of sound produced by an object in terms of annoyance or pleasantness in order to improve people's interactions with the object. In light of modern-day electrification and the increasing amount of urbanization, the relevance of human perception of an object's sound is increasing, especially with regard to their pleasantness or their potential to be perceived as disturbing.

Moreover, analysis of electromechanical systems for noise, vibration, and harshness (NVH) is an important part of product development and manufacturing quality control. Poor NVH performance can increase user fatigue while working with the product, cause additional degradation (wear and tear) of the product over time, and negatively impact customers' purchasing decisions.

Sound quality evaluation of many electrical devices typically includes allowing a jury of listeners to hear the sound and rate the pleasantness of the sound. However, this can be time consuming and requires a new jury of listeners for each new product developed. NVH analysis is typically measured with sensors in a laboratory setting, and does not often account for the pleasantness of a sound. Moreover, the measured qualities of a sound during an NVH analysis may be unpleasant to some people, but pleasant to others.

SUMMARY

According to one embodiment, a method of predicting a pleasantness of a sound emitted from a device utilizing machine learning comprises: receiving a plurality of pleasantness ratings from one or more human jurors, each pleasantness rating corresponding to a respective one of a plurality of sounds emitted by one or more devices; detecting, via a microphone system, a plurality of measurable sound qualities, each measurable sound quality associated with a respective one of the plurality of sounds; training a regression prediction model based on, for each respective sound, its pleasantness rating and its corresponding measurable sound quality until convergence yields a trained regression prediction model; detecting, via the microphone, a measurable sound quality of an unrated sound, wherein the unrated sound has not been rated by the one or more human jurors; and executing the trained regression prediction model on the measurable sound quality of the unrated sound to yield a plurality of predicted pleasantness difference ratings, each predicted pleasantness difference rating corresponding to a respective pairwise comparison between the unrated sound and a respective one of the plurality of sounds.

According to another embodiment, a system for predicting a pleasantness of a sound emitted from a device utilizing machine learning comprises a microphone configured to detect a plurality of sounds emitted by one or more devices; processor programmed to process the plurality of sounds; and a memory storing instructions that, when executed by the processor, cause the processor to perform various steps. The steps include: receive a plurality of pleasantness ratings from one or more human jurors, each pleasantness rating corresponding to a respective one of the plurality of sounds, detect a plurality of measurable sound qualities, each measurable sound quality associated with a respective one of the plurality of sounds detected by the microphone, train a regression prediction model based on, for each respective sound, its pleasantness rating and its corresponding measurable sound quality until convergence yields a trained regression prediction model, detect a measurable sound quality of an unrated sound, wherein the unrated sound has not been rated by the one or more jurors, and execute the trained regression prediction model on the measurable sound quality of the unrated sound to yield a plurality of predicted pleasantness difference ratings, each predicted pleasantness difference rating corresponding to a respective pairwise comparison between unrated sound and a respective one of the plurality of sounds.

According to yet another embodiment, A method of predicting a pleasantness of a sound emitted from a device utilizing machine learning includes: receiving a plurality of pleasantness ratings from one or more human jurors, each pleasantness rating corresponding to a respective one of a plurality of sounds emitted by one or more devices; detecting, via a microphone system, a plurality of measurable sound qualities, each measurable sound quality associated with a respective one of the plurality of sounds; detecting, via the microphone system, a measurable sound quality of an unrated sound, wherein the unrated sound has not been rated by the one or more human jurors; executing a regression prediction model on the measurable sound quality of the unrated sound to yield a plurality of predicted pleasantness difference ratings, each predicted pleasantness difference rating corresponding to a respective pairwise comparison between the unrated sound and a respective one of the plurality of sounds; for each pairwise comparison, combining the predicted pleasantness difference rating with a respective one of the pleasantness ratings to yield a respective summed rating; and outputting an overall predicted pleasantness rating of the unrated sound based upon an average of the summed ratings.

BRIEF DESCRIPTION OF THE DRAWINGS

FIG. 3 illustrates systems and methods for predicting sound pleasantness using a binary classification machine-learning model, in which

FIG. 4 illustrates a system flow chart of predicting sound pleasantness using a regression prediction machine-learning model, according to an embodiment.

DETAILED DESCRIPTION

Figure 1:
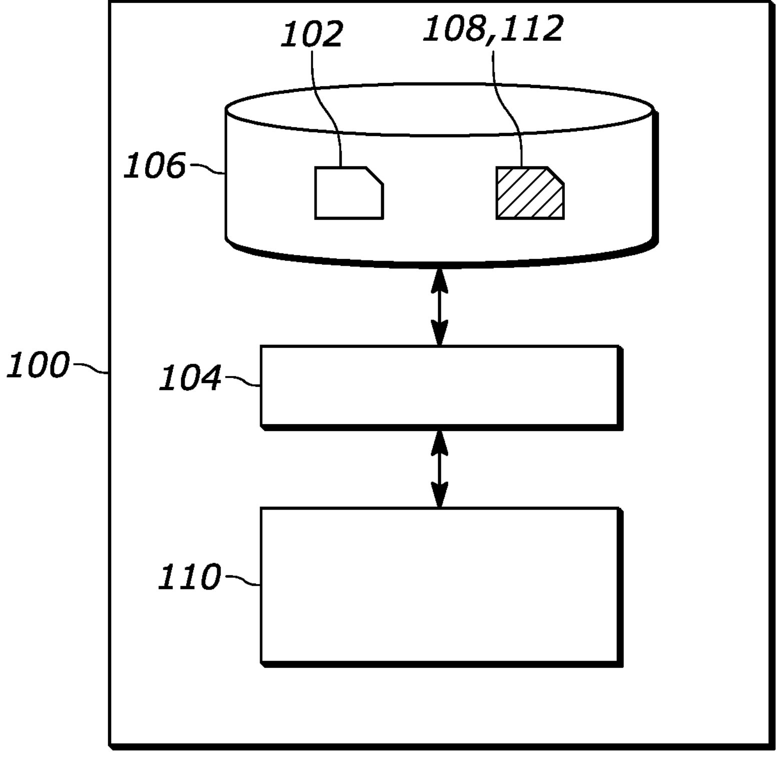
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure refers to various measurable qualities of sound, such as loudness, tonality, and sharpness. Loudness refers to the intensity or amplitude of sound. Loudness can refer to either the actual measured loudness of the sound, or a person's perception of sound intensity. Loudness can be measured on the decibel scale (e.g., to measure the loudness of the sound), or the phon scale (e.g., to measure a person's perception of the sound). Tonality refers to a measurement of sound quality that correlates to how humans perceive the tonal components (e.g., pitch, tone, chord, key, etc.) of the sound. Sharpness refers to the frequency of the sound, or the amount of high frequency content of a sound; the higher the proportion of high frequency, the sharper the sound. Other types of measurable sound qualities can include roughness (e.g., emphasizing the slow temporary changes in loudness at a certain frequency such as 70 Hz), envelope (e.g., attack, decay, sustain and release of a sound), and others.

Sound quality evaluation, for instance, studies how users perceive the quality of the sounds of industrial objects (electronic devices, cars, electrical appliances, etc.), and establishes specifications for the design of these sounds. Sound quality evaluation can refer to the evaluation of sound produced by an object in terms of annoyance or pleasantness in order to improve people's interactions with the object. In light of modern-day electrification and the increasing amount of urbanization, the relevance of human perception of an object's sound is increasing, especially with regard to their pleasantness or their potential to be perceived as disturbing.

According to various embodiments disclosed herein, methods and systems for using machine learning modeling to predict pleasantness of a sound of a device are provided. This approach can be used, for example, to estimate the human perception of the currently-emitted sound when controlling stationary devices (e.g., pumps, heat pumps, fans, electronic devices, etc.). This estimation can then be used to optimize the control of the device with regard to the human acoustic perception. This is done by a machine learning algorithm and based on the signals of one or more microphones or acceleration sensors, which are pre-processed and then compared with corresponding signals, for which the quality in terms of human perception has already been determined in listening tests in the form of numerical values on a continuous scale. The predicted comparison results are then accumulated by a subsequent algorithm for estimating the actual sound quality, on the basis of which the control of the product can be adapted.

The disclosed methods and systems offer a new approach for regression tasks in cases where only small amounts of training data are available. This is achieved by a transformation of the original task into a classification task, followed by further processing of the classification results in order to solve the original regression problem. For example, in embodiments, a machine learning model is trained on a jury of human evaluators that score or rate various sounds. During training, the measurable qualities of one sound (e.g., loudness, tonality, sharpness, vibration, voltage, etc.) are compared with corresponding measurable qualities of another sound in pairwise fashion. The comparison can yield a difference in the respective qualities. Binary classifications can be implemented, for example "0" meaning sound quality A is more pleasant than sound quality B, and "1" meaning sound quality B is more pleasant than sound quality A. Once trained a regression task can be utilized to compare the sound qualities of a new sound with all of the stored sound qualities from training, and based on similarities with other sound qualities, a prediction of that new sound's pleasantness can be generated by the model.

Figure 2:
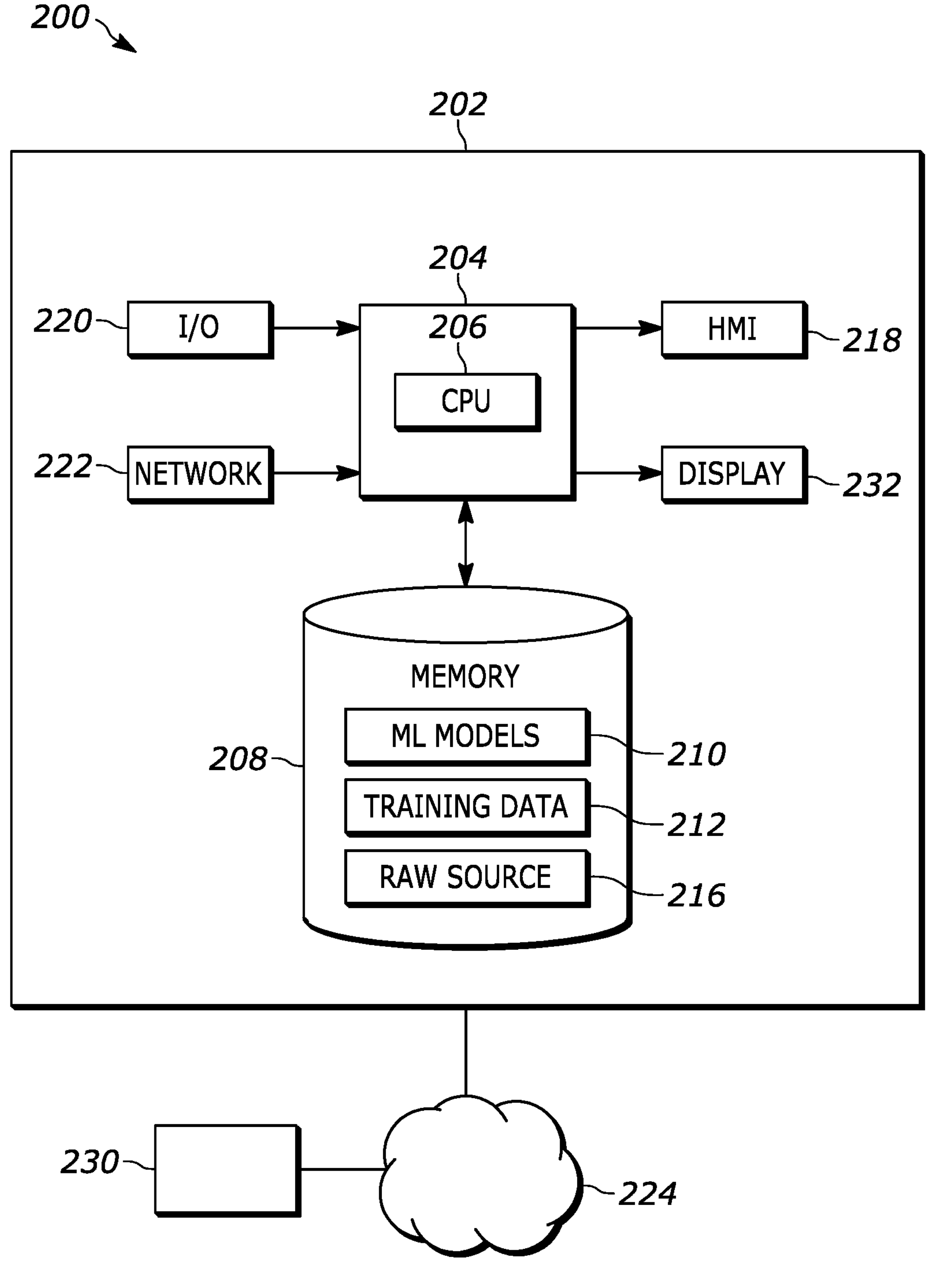
FIG. 2 shows a computer-implemented method for training and utilizing a neural network, according to an embodiment.

Additional details regarding the training of the models, and the use of the models to predict a sound pleasantness will be provided below. But first, reference is made to FIGS. 1-2 in which FIG. 1 shows a system 100 for training a neural network, e.g. a deep neural network, and FIG. 2 shows a system 200 to execute the machine learning models 210 described herein (e.g., a binary classification model, a regression model, and a regression prediction model which are described with reference to FIGS. 3-4.) Referring to FIG. 1, the system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the machine learning models described herein. Additional structure for operating and training the machine-learning models is shown in FIG. 2.

FIG. 2 depicts a system 200 to implement the machine-learning models described herein, for example the binary classification model, the regression model, and the regression prediction model described with reference to FIGS. 3-4 below. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 that is configured to analyze the raw source dataset 216. The raw source dataset 216 may include raw or unprocessed sensor data that may be representative of an input dataset for a machine-learning system. The raw source dataset 216 may include measurable sound qualities such as loudness, tonality, sharpness, and the like. The raw source dataset 216 may also include measurable non-sound qualities that nonetheless may cause or otherwise be associated with the sound produced by the device, such as time series data (e.g., a pressure sensor signal over time), vibrational data, temperature data, voltage data, current data, etc.). The raw source dataset 216 may be entirely raw or partially processed sensor data received by or originating from one or more of the sensors described herein. Several different examples of inputs are shown and described with reference to FIGS. 5-11. In some examples, the machine-learning model 210 may be a neural network algorithm (e.g., deep neural network) that is designed to perform a predetermined function. For example, the neural network algorithm may be configured to predict a pleasantness score of the sound of a vehicle engine or motor. The machine-learning model(s) 210 may include algorithms configured to operate the binary classification model, regression model, and regression prediction model described further below with reference to FIGS. 3-4.

The computer system 200 may store a training dataset 212 for the machine-learning model 210. The training dataset 212 may represent a set of previously constructed data for training the machine-learning model 210. For example, the training dataset 212 may contain the measurable sound qualities or non-sound qualities described above, and an associated score or rank as to the corresponding sound's pleasantness. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare a new sound (e.g., its associated measurable sound qualities or non-sound qualities) with the sounds included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify particular features in the raw source data 216 that corresponds to a high sound pleasantness, and other features that correspond to a low sound pleasantness. The raw source data 216 may include a plurality of instances or input dataset for which sound pleasantness is desired. For example, the machine-learning algorithm 210 may be configured to identify the presence of a particular pitch or tone of sound that more often than not corresponds with a low pleasantness score. The machine-learning algorithm 210 may be programmed to process the raw source data 216 to identify the presence of the particular features.

The raw source data 216 may be derived from a variety of sources. For example, the raw source data 216 may be actual input data collected by a machine-learning system. The raw source data 216 may be machine generated for testing the system. In embodiments, the raw source data 216 includes measurable sound qualities as received from a microphone or other sound sensor (e.g., sound sensor module having microphone, peak detector, and amplifier). Other pre-processing can be applied to the raw source data 216, such as noise filtering, minimum and maximum thresholds, peak detection, and the like. For example, while a microphone can detect the sound, a microphone system (e.g., a microphone equipped with an associated processor) can detect or determine the measurable sound qualities of the sound.

Figure 3A:
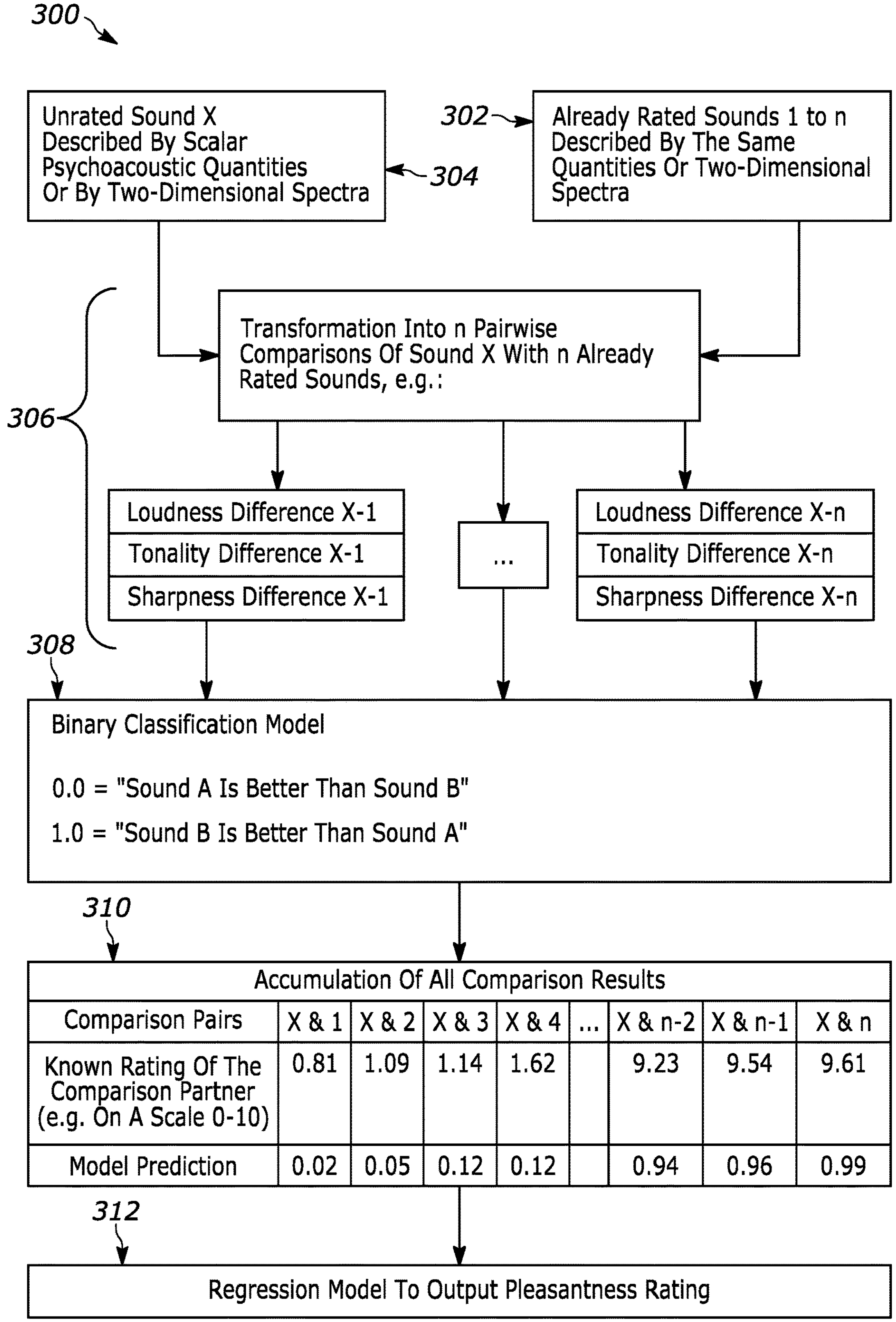
FIG. 3A shows a system flow chart.

Given the above description of the machine-learning models, along with the structural examples of FIGS. 1-2 configured to carry out the models, FIG. 3A illustrates a flow chart of a system 300 for predicting a pleasantness rating of a sound, according to an embodiment. The system 300 can be end-to-end in that it contains a system for training a machine-learning model (e.g., binary classification model) that can be used in the ultimate prediction of the sound pleasantness. Of course, as mentioned elsewhere herein, while the system 300 is referred to as predicting pleasantness of sound, it can be used on measurable non-sound data such as vibration that can nonetheless be associated with the sound output by the device.

Two models are shown in FIG. 3A, namely a binary classification model and a regression model. FIG. 3A shows the use and implementation of these two models. But first, these models must be trained. To train the binary classification model, input data is received regarding sounds that have already been rated by a plurality of human jurors. As an example, the human jurors can listen to a number n of sounds output by one or more various devices such as heat pumps, motors, rotors, vehicle engines, power tools, appliances, computers, laptops, etc. in listening tests. The types of devices subject to the listening tests are virtually unlimited and can include anything that produces a sound. The jurors can simply rate the sound based on their pleasantness, for example on a zero to ten scale. Meanwhile, measurable sound data associated with the sounds are recorded, for example in memory 208 as raw source data 216. The measurable sound data can include descriptive quantities and can be scalar (e.g., psychoacoustic quantities such as loudness, tonality, sharpness, etc.), one-dimensional vectors (e.g., loudness over time), or two-dimensional spectra (e.g., frequency analyses such as Fast Fourier Transforms (FFT) versus time). A combination of these measurable qualities using different input channels is also possible.

In order to prepare the models for training, the rated sounds are combined with each other in both directions (e.g., sound $n_1$ compared to sound $n_2$, and sound $n_2$ compared to sound $n_1$). The differences between the measured sound qualities, as well as the jury ratings, are computed in both directions. This can be done in pairwise fashion. For example, for each of the measured sound data of each sound, as well as the corresponding pleasantness ratings of each sound, the data is transformed into n pairwise comparisons. Assuming n number of sounds, this yields $n^2$ number of comparison pairs. The main diagonal (e.g., a sound compared with itself, such as Sound 2 compared to Sound 2) can be removed from the data, or zeroed out. Likewise, if existing, the comparisons of sounds with exactly the same jury evaluation (e.g., the difference between the jury rating of Sound 4 compared to Sound 7 is zero) can be removed. Such pairwise comparisons can be created for the measurable sound data as well as the jury rating. The resulting data can be scaled (e.g., on a scale from 0 to 1) for better processing by the model.

Figure 3B:
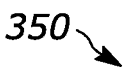
FIG. 3B shows a table illustrating an embodiment of sound-by-sound pairwise comparisons.

FIG. 3B shows an example of a table 350 resulting from such a pairwise comparison of seven different sounds. This example shows the differences between the jury ratings on sound pleasantness, scaled on a 0 to 1 scale. The horizontal header of each column represents the first sound in the comparison, and the vertical header of each row represents the second sound in the comparison. In this illustrated example, the cell at the intersection of column “Sound 1” and row “Sound 2” is the difference in pleasantness rating from Sound 1 to Sound 2. With the example of a jury rating of a zero to ten scale, this pairwise comparison would lead to jury rating differences between two compared sounds between −10 (the worst sound rated as a zero compared to the best sound rated as a ten) and 10 (the best sound rated as a ten compared to the worst sound rated as a zero). Values opposite of the diagonal (e.g., comparisons of Sound A to Sound B, and Sound B to Sound A) have the same values but different algebraic signs (+/−). These pairwise rating differences can then be scaled to a scale from −1 to 1 by division by the largest pairwise difference (in this example this would be division by 10) which would still preserve the relation to the values opposite of the diagonal. A scaling between 0 and 1 includes a shift of values such that the sum of two comparison difference (A−B and B−A) is always equal to 1. As can be seen in FIG. 3B, the total number of pairwise comparisons is equal to the square of the number of sounds, minus the diagonal of each sound quality compared to itself, or ($n^2$−n).

While not shown, similar tables of pairwise comparisons can be made for each of the other measured sound qualities (e.g., sharpness, tonality, loudness, etc.) for each sound. For example, a similar table can be made that compares the tonality of each sound with the tonality of each of the other sounds, such that the sound quality of each sound is compared with the sound quality of all of the other sounds in pairwise fashion. This can be done for the other sound measurable, such as loudness, sharpness, etc.

According to embodiments, the inputs to the system (e.g., measured sound qualities and jury ratings) are not fed into the binary classification model separately or individually. Instead, their differences are first calculated according to the pairwise comparison described above. This reduces the number of required model weights and is therefore more efficient in terms of the necessary amount of training data as well as in terms of optimizing the weights. Additionally, this approach yields input variables which are automatically centered around 0, which is typically advantageous for the machine learning methods which are suitable for solving the problem. The use of the difference is based on the assumption that regardless of the actual values of the sound characteristics (such as the loudness) of two comparison sounds, the same difference always leads to the same preference. If this assumption is not valid, a characteristic absolute value (e.g. the maximum sound pressure level of sound A) can additionally be transferred to the model through a further input channel, which still leads to a smaller number of model parameters to be optimized compared to the separate transfer of the two sounds, while maintaining the above-mentioned advantages.

Figure 3C:
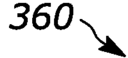
FIG. 3C shows conversion of results into binary format, according to an embodiment.

With respect to the pleasantness scores and their differences, the binary classification model can be trained by overwriting each pleasantness score difference with a binary value, for example, either a “0” or a “1”. For each respective sound rating being compared, the output of these pairwise comparisons is overwritten with either one of a binary value depending on which sound rates better in each comparison. For example, referring to FIG. 3B, if the jury rating of Sound 2 rates better than Sound 3 (shown with a 0.88 difference), that value is overwritten with a “1” indicating that Sound 2 was rated by the jury as being more pleasant. For every sound in which the pleasantness of the Sound in the column header rates better than the pleasantness of the Sound in the row header, the value can be replaced with "1"; for every sound in which the pleasantness of the Sound in the column header rates worse than the pleasantness of the Sound in the column header, the value can be replaced with "0". FIG. 3C illustrates a resulting binary table 360 converting the values of FIG. 3B into binary format.

Said another way, the binary classification model can be trained by (a) determining a difference between each sound's pleasantness rating and every other sound's pleasantness rating in a pairwise fashion, and (b) converting the differences into either a first binary value or a second binary value depending upon which pleasantness rating exceeds the other in each pairwise comparison.

The measurable sound data input, on the other hand, need not be converted into binary format. However, the difference between the measurable sound qualities of each pairwise comparison can be stored in memory and relied upon when executing the binary classification model. For example, if Sound 2 has a loudness of 45 dB and Sound 3 has a loudness of 72 dB, then the difference between Sound 2 and Sound 3 can be stored as −27, and the difference between Sound 3 and Sound 2 can be stored as 27.

The binary classification model is thus optimized to make a binary classification of a sound. By processing the measurable sound qualities with its associated sound rating comparisons, the model is configured to make a binary prediction between two sounds (e.g., "1" is Sound A is more pleasant than Sound B, and "0" if Sound B is more pleasant than Sound A) based on the differences of the measured sound qualities. The binary classification model can rely on neural networks (e.g., deep neural networks) or other mathematical methods suited for binary classification (e.g., Random Forest, support vector machine, etc.) to perform such predictions.

This allows the binary classification model to act on a new sound not rated by a jury. Referring to FIG. 3A, the system 300 can proceed according to the following embodiment. At 302, sounds that have already been rated by a jury are received or retrieved from storage. This includes receiving not only the jury rating comparisons of each sound, but also the measurable sound qualities for each sound, and all pairwise comparisons described above.

At 304, a new sound (e.g., "Sound X") that has not been scored by a jury is processed. This can include receiving the sound via a microphone, and/or processing the sound to determine its measurable qualities such as loudness, sharpness, and tonality. The sound can also be described in any format that the already-rated sounds are described in, such as scalar psychoacoustic quantities or two-dimensional spectra, as described above.

At 306, the system performs a pairwise comparison between the unrated Sound X and the already-rated number of sounds n. This computation includes a pairwise comparison of each measurable sound quality determined in 304, such as loudness, tonality, sharpness, etc. These measurable sound qualities of Sound X are compared with corresponding measurable sound qualities of the rated sounds of 302 in pairwise fashion. For example, the tonality of Sound X is compared with the tonality of each of the Sounds 1-n. Similar comparisons are made for each of the other sound qualities (e.g., sharpness, loudness) between Sound X and Sounds 1-n.

As explained above, the binary classification model does not receive or process the measurable sound quality inputs from 304 and 306 separately or individually. Instead, for each type of sound quality, the differences between each of the sounds is computed; these differences are used as input to the binary classification model at 308. As explained above, This reduces the number of required model weights and is therefore more efficient in terms of the necessary amount of training data as well as in terms of optimizing the weights.

At 308, the binary classification model predicts whether Sound X is better than each of the other Sounds 1-n. This can be done using neural networks such as those described above (e.g., Random Forest, support vector machine, etc.) based on the differences computed above (e.g., pairwise comparisons of measurable sound qualities for each sound). For each sound comparison, the result of the binary classification model at 308 can return a "1" if Sound X is predicted to be more pleasant than the compared sound (e.g., Sound A), or a "0" if Sound X is predicted to be less pleasant than Sound A. According to an embodiment, this result need not be a binary integer, but instead a floating point number in the range between 0 and 1, which can be interpreted as a probability of the comparison pair being evaluated with a 0 or 1. Predictions that are close to 1 are to be interpreted as a high probability that Sound X is more pleasant than Sound A, and predictions that are close to 0 are interpreted as a high probability that Sound X is less pleasant than Sound A.

The result of the binary classification model is a comparison of Sound X with every other sound that has already been rated. Based on the measurable sound qualities of the rated sounds 1-n, along with their jury-rated pleasantness score, the binary classification model is configured to output a score between 0 and 1 regarding the likelihood or confidence of Sound X's pleasantness as compared to each sound. For example, the binary classification model may output a number 0.92 when comparing Sound X to of Sound 7, indicating a relatively high degree of confidence that Sound X would be rated by a jury to have a more pleasant sound than Sound 7. In contrast, the binary classification model may output a number 0.11 when comparing Sound X to Sound 8, indicating a relatively high degree of confidence that Sound X would be rated by a jury to have a less pleasant sound than Sound 8.

The outputs of the binary classification model at 308 can be used in order to compare a sound X to any other sound. These outputs have their own standalone uses if such a sound-by-sound comparison is desired. As an example, a user may wish to understand whether Sound X would be rated by a jury to be more pleasant than Sound 3, Sound 5, and/or Sound 7. However, the outputs from the binary classification model 308 can also be used to generate an overall pleasantness rating of Sound X. For example, a regression model can be trained by comparing an additional set of rated sounds with the previously-rated sounds that were used in training of the binary classification model. This results in pairwise comparisons for each measured sound quality, along with pleasantness predictions for each additional sound compared to the previously-rated sounds. Alternatively, a number k of representative sounds can be selected from the previously-rated sounds used to train the binary classification model, and compared with the remaining n−k sounds of the previously-rated sounds. These comparisons serve as a basis for optimizing the regression model, which transfers the binary classification model's predictions of the pairwise comparisons with all other sounds to the actual jury evaluation on a continuous scale. Once trained, a regression task can compare the measurable sound qualities of a new sound (e.g., Sound X) with those that are already known from training.

Referring to the example shown in FIG. 3A, at 310 all pairwise comparisons between Sound X and the number n of jury-rated sounds used by the binary classification model 308 are accumulated. The sound pleasantness rating of the jury-rated number of sounds n can also be compiled. For example, as shown here, for the comparison of Sound X and Sound 1, 0.81 represents the pleasantness rating of Sound 1; for the comparison of Sound X to Sound 2, 1.09 represents the pleasantness rating of Sound 2; and so on. As described above, these jury sound ratings may be on a scale of zero to ten as shown here at 310; but other scales may be used, such as 0-100, or letter grades ("A" thru "F"), and so on. The last row of 310 shows a model prediction, again representing the number between 0 and 1 of whether Sound X would be rated higher or lower than the comparison sound partner. For example, the comparison of Sound X to Sound 1 yields a 0.02, indicating a high degree of certainty or probability that Sound X is less pleasant than Sound 1. Likewise, a comparison of Sound X to Sound n yields a 0.99, indicating a high degree of certainty or probability that Sound X is more pleasant than Sound n.

Utilizing a regression task at 312, the regression model outputs an overall pleasantness rating of Sound X. Each model prediction output at 310 regarding the comparison of the Sound X to the rated sounds is utilized by the regression task at 312. In general, the regression task draws on the conclusion of the final rating of the unknown Sound X from the list of predictions from the binary classification model (e.g., comparisons of Sound X with each already-known sound) and the known jury ratings of the comparison partners. One approach can be to take the known jury prediction of the lowest rated known sound for which the binary classification model predicted that Sound X will be rated better than, and take the known jury prediction of the highest rated sound for which the binary classification model predicted that Sound X will be rated worse than, and derive the mean of these two as the final jury rating of Sound X. Other more complex models can take into account the full range of binary prediction values including the value distribution of known jury ratings of the comparison sounds. These models can, just like the binary classifier, be machine learning models.

Thus, the regression model 312 can be configured to output predicted pleasantness scores of various sounds that have not been rated by juries. This pleasantness score can be scaled so that it matches the same scale used by the juries (e.g., zero to ten scale). In order to predict the expected jury rating of new, unrated sounds, these sounds should first be described by the same quantities that were used to train the binary classification model 308, such as tonality, sharpness, and/or loudness. Then, these sounds are paired with the known sounds used in the training of the binary classification model 308 (e.g., as described in 302), and the differences of the measured sound quantities are formed. If necessary, these are preprocessed using the same scaling method as in the optimization of the binary classification model. The binary classification model 312 then makes a prediction for each sound comparison pair, comparing the new unrated sound to the previously-rated sound. The resulting list of predicted comparison results with the already known n or n−k sounds is then used by the regression model for the final regression on a continuous scale.

The embodiment of FIG. 3 includes a special consideration of extreme values, according to an embodiment. If a new sound is predicted to be worse than any sound used in training the model, the worst training rating minus the average difference of all training sounds will be assigned to it. Conversely, if a new sound is predicted to be better than any given training sound, the best training rating plus the average difference of all training sounds will be assigned to it.

The embodiment of FIG. 3 also makes the final regression decision not on the basis of lists of zeros and ones, but on the basis of the predicted probabilities using a second, subsequent regression model. For this purpose, the prediction of the pairwise comparisons is not rounded to 0 or 1, but is left as a floating point number between 0 and 1, which can be interpreted as the probability of the event being better or worse than its comparison sound. The second model (e.g., regression model) then makes the final regression decision for a new sound on the basis of the predicted probabilities of the pair comparisons carried out by the first model (e.g., binary classification model). This means that the second model now has to solve a regression task, which is more complex than binary classification, but it can benefit from the extensive preprocessing carried out by the first model.

The embodiment of FIG. 3 is efficient concerning the binary classification of pair comparisons, as the difference of two sounds is used as an input to the binary classification model. Additionally, this embodiment takes into account extreme values and enables a more accurate prediction than the mere estimation of the final regression result based on two lists of zeros and ones, especially when the number of already-labelled training sounds increases.

FIG. 4 illustrates an alternative embodiment of a flow chart of a system 400 for determining a pleasantness rating of an unrated sound. Again, the steps illustrated in the flow chart shown in FIG. 4 may be carried out using the structure illustrated in FIGS. 1-2, for example. Unlike the methods described above with reference to FIG. 3, where pairwise classifications are used, here, according to this embodiment, pairwise relative regression problems are used with subsequent average over the absolute pairwise prediction values.

In general, a regression problem can be formulated as the task of finding a function $\hat{y}=f(x)$, so that over all n sample pairs $(x_i, y_i)\in(X,Y)$ of a training data set X, Y, the error or loss rate $L(\hat{y}_n-y_n)$ is minimized, with $\hat{y}_i=f(x_i)$. In the example of FIG. 4, x is the measured sound quality of sound, and y is the score that can be scaled, e.g., on a zero to ten scale. The pairwise relative regression used herein can be formulated as the problem of finding a function $\hat{y}_{i,j}=g(x_i,x_j)$, so that for all $(x_i,y_i)\in(X,Y)$, $(x_j, y_j)\in(X,Y)$ of a training dataset X, Y the error or loss rate $L(y_{i,j}-\hat{y}_{i,j})$ is minimized. Subsequently, a return to the absolute scale is carried out by an appropriate averaging over the predictions of the pairwise relative regression, e.g., calculate the missing value as $\hat{y}_i=M_{j=1 \ldots n}(\hat{y}_{i,j}+y_j)$ for example by averaging with a weighting based on the negative exponential regression difference as $$\hat{y}_i = \frac{1}{C}\sum_j e^{-C_2|x_i-x_j|}\left(y_j + \hat{y}_{i,j}\right) \text{ with } C = \sum_j e^{-C_2|x_i-x_j|} \text{ and } |x_i - x_j|$$

as a suitable distance metric in the input data space (e.g. the Euclidean standard). Here, $\hat{y}_i$ is the final rating prediction for sound i, $\hat{y}_{i,j}$ is the prediction of the regression model for the rating difference between sounds i and j, $y_j$ is the known rating of the comparison sound j, M is an averaging function, $C_2$ is a constant, and $x_i$,$x_j$ are quantities of sounds i and j in the input feature space (e.g., loudness values for i and j). An exemplary option for the error or loss rate L is the square root of the mean squared deviations ("Root Mean Square Error") of the training value, $$L(\hat{y}_n - y_n) = \sqrt{\frac{1}{n-1}\sum_{i=0}^{n}(\hat{y}_i - y_i)^2}.$$

Referring to FIG. 4, the system 400 includes a regression prediction model described below. First, the model is trained. The training can include similar training data as described above with reference to FIG. 3. For example, the regression prediction model can be trained based on machine learning methods (e.g., an artificial neural network) using sounds which have already been rated by one or more human jurors in listening tests. The descriptive quantities used as input data in this model can be scalar (e.g., loudness, tonality, sharpness), one-dimensional vectors (e.g., loudness versus time), two-dimensional spectra (e.g., FFT versus time), or a combination of the different representations. In order to prepare for the model training, all rated sounds are combined with each other in both directions (e.g., comparing sound A to B, and comparing sound B to A). The input data of a pair can then be fed into the regression prediction model through separate input channels, via one input channel which receives the difference of the features of the two compared sounds, or using a combination of a difference along with additional characteristic quantities. As the output variable, the difference of the juror evaluations of the paired sounds is formed. In the case of n number of sounds, this yields $n^2$ comparison pairs. In case that the sound difference is used as an input, the comparisons on the main diagonal can be removed (similar to FIG. 3B above), as all input and output quantities on the main diagonal are zero. The input data may then be scaled for better processing by the algorithm. The target variable of the regression prediction model is the difference in the jury ratings of the two sounds compared. The model is then optimized to predict the difference of the two jury ratings when being fed a pair of input variables.

Once trained, this allows the regression prediction model to act on a new sound not rated by a jury. Referring to FIG. 4, the system 400 can proceed according to the following embodiment. At 402, sounds that have already been rated by a jury are received or retrieved from storage. This includes receiving not only the jury rating comparisons of each sound, but also the measurable sound qualities for each sound, and all pairwise comparisons described above. A number n of these sounds $x_j$ is received or retrieved, for j=1 . . . n.

At 404, a new sound (e.g., "$x_i$") that has not been scored by a jury is processed. This can include receiving the sound via a microphone, and/or processing the sound to determine its measurable qualities such as loudness, sharpness, and tonality. The sound can also be described in any format that the already-rated sounds are described in, such as scalar psychoacoustic quantities or two-dimensional spectra, as described above.

The regression prediction model 406, also referred to as a pairwise relative regression prediction model, then acts on this data in pairwise fashion, comparing the measured sound qualities of the unrated sound $x_i$ to the measured sound qualities of each jury-rated sound $x_j$. The model predicts the difference between the jury rating of the new sound and the respective comparison sound for all pair comparisons. Using the model as trained per the examples above, the regression prediction model 406 can compare the sound qualities of $x_i$ to the sound qualities of $x_j$ and output a prediction $y_{i,j}$ based on the two compared qualities, along with the known jury rating of the already-rated sound $x_j$.

Shown in the example at 406 is a predicted rating of sound $x_i$ compared to each sound $x_j$ for j=1 . . . n. In this example, when comparing the new unrated sound $x_i$ to sound $x_1$, the model predicts the new sound $x_i$ to have a rating ($y_i$) to be +4.15 higher than the known rating $y_1$ of the jury-rated compared sound $x_1$. In other words, the model outputs a predicted pleasantness difference rating of 4.15 for the pairwise comparison of sound $x_j$ to sound $x_1$. This process continues for each sound $x_j$ up until the number n of sounds, comparing the unrated sound to each. In this example, at the sound $x_n$, the model predicts the difference in ratings between the unrated sound $x_i$ and the rated sound $x_n$ to be –4.5. In other words, the rating on a scale of zero to ten is 4.5 less for the unrated sound $x_i$.

At 408, the comparison results from the output of the regression prediction model 406 are compiled or accumulated for a summary. In other words, the difference in ratings between unrated sound $x_i$ and each respective rated sound $x_j$ is compiled. The first row shows the known rating $y_j$ of each sound that is compared to the unrated sound. For example, the average jury rating $y_1$ of sound pleasantness for the first sound $x_1$ is 0.81; the average jury rating $y_2$ of sound pleasantness for the second sound $x_2$ is 1.09; and so on. For each sound, this number is added or combined with the output of the regression prediction model 406 to arrive at a summed rating $y_j+\hat{y}_{i,j}$. This represents a predicted rating of the unrated sound based on its comparison to each already-rated sound using the regression prediction model.

At 410, the system determines a weighted mean of all of the summed ratings. In one embodiments, weights are placed on each of the summed ratings depending on its divergence from the actual mean. For example, as the summed ratings deviate from the mean more and more, the weights placed on those summed ratings is reduced. This weights the ratings that are closer to the average more heavily.

The resulting weighted mean represents an overall predicted pleasantness rating $y_i$ of the new, unrated sound. Thus, the system 400 can predict a pleasantness rating of an unrated sound by comparing its measured sound qualities to those of the already-jury-rated sounds in a regression prediction model.

In general, once the regression prediction model is trained, it can be used to predict an expected jury rating of a new, unrated sound. In order to predict the expected jury rating of new, unrated sounds, the unrated sounds firstly need to be described by the same quantities that were used to train the model (e.g., loudness, tonality, sharpness, etc.). Then, each measured sound quality is paired with the corresponding sound quality of each of the already-rated sounds used for training the model. The input quantities of the pair comparisons are derived. If necessary, these are preprocessed using the same scaling method as in the optimization of the model. The model then predicts the difference between the jury rating of the new sound and the respective comparison sound for all pair comparisons. Now, the desired jury rating of the unrated sound can be determined by calculating a correspondingly weighted average of all known sound ratings plus the associated predicted differences to the unrated sound.

One advantage of the system of FIG. 4 compared to the embodiment of FIG. 3 and other systems is that an intermediate step of converting the initial regression task into a classification problem is not needed. While in the case of a conversion into a classification task only the samples in the fluctuation area of the classification problem (thus between prediction "0—new sound is less tonal/pleasant/ . . . " and "1—new sound is more tonal/pleasant/ . . . ") can contribute to the prediction result, pair comparisons of all training samples can contribute to it in case of the relative regression approach, which can improve the prediction accuracy.

Advantages over established methods can in particular be achieved, if only small amounts of data are available for training the model or calibrating the regression function respectively. Feeding the data of the two samples of a comparison pair to the model can be done (a) separately (for example, via two different input channels of an artificial neural network) as $\hat{y}_{i,j}=g(x_i,x_j)$, as well as (b) as the difference of the two samples $\hat{y}_{i,j}=\tilde{g}(x_i-x_j)$, or (c) as a combination of the difference between the samples and one or more additional characteristic quantities $\hat{y}_{i,j}=\hat{g}(x_i-x_j,\ h(x_i,x_j))$. While approach (a) is suitable in particular in a case of a high-dimensional representation of the samples (for example short-term spectra or time signals of sounds in the case of acoustic tasks), variants (b) and (c) are particularly suitable for low-dimensional representations of samples (e.g. a combination of one-dimensional psychoacoustic quantities in the case of acoustic tasks).

In addition, the method described in FIG. 4 is conceptually simpler and the step of converting the classification problem into a regression problem is no longer needed, but is replaced by averaging over the relative regression values.

The systems and methods described above can be used, for example, to optimize the control of products with respect to the acoustic properties of the sound emitted by them (e.g., the sound's pleasantness, loudness, tonality, etc.). This optimization can take place both in the course of the product development process and dynamically at the time of product application. An example of a use case is a heat pump in a densely populated residential area, where the systems described above (i) use a sensor (microphone, acceleration sensor, etc.) to measure the sound qualities emitting from the product, and (ii) rate its pleasantness on the basis of pairwise comparisons with the sound qualities of sounds that are already known to the system. This evaluation can then be used to optimize the control of the heat pump in the current operating point to alter the sound generated by the heat pump.

Other examples of devices whose acoustic properties can be optimized using the suggested approach are electric vehicles, electric tools, and other devices. Examples of these are shown in FIGS. 6-11 and described below. Structure used for training and using the machine-learning models for these applications (and other applications) are exemplified in FIG. 5.

Figure 5:
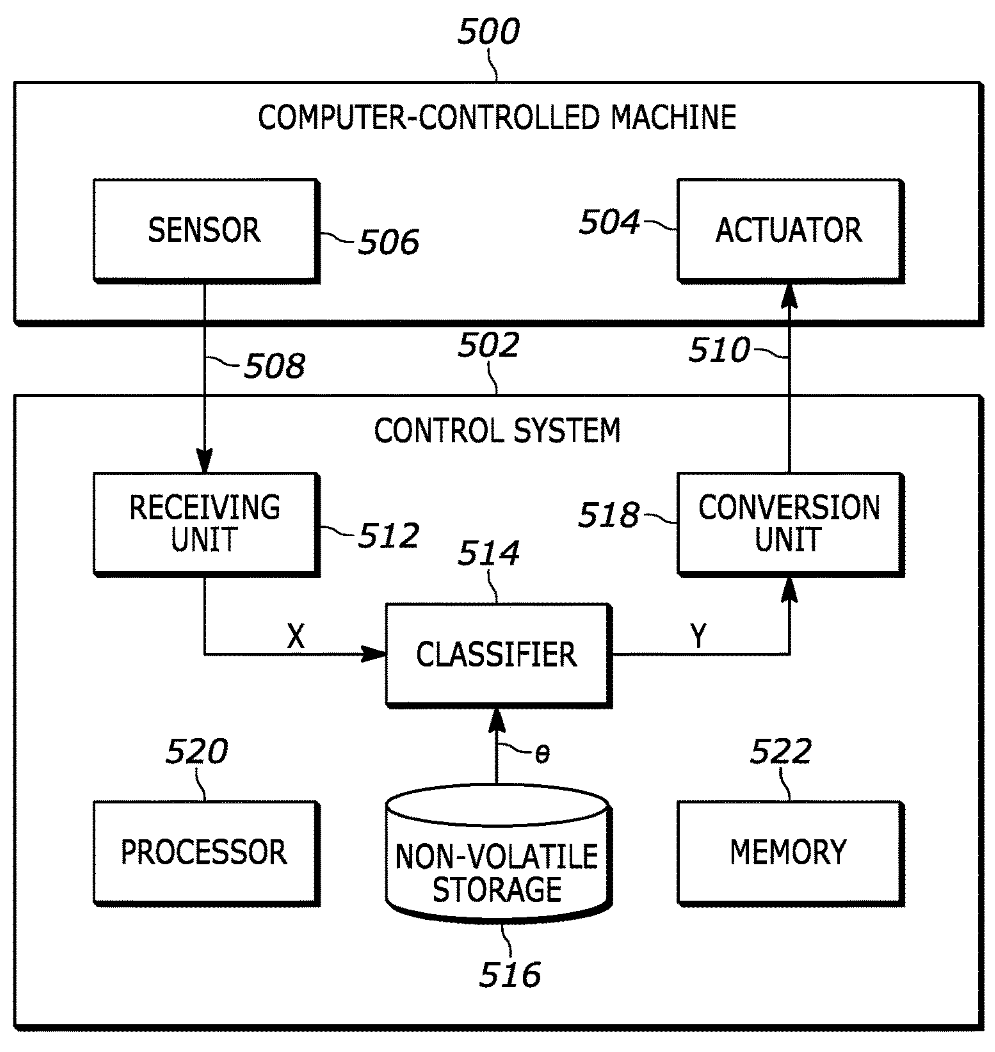
FIG. 5 depicts a schematic diagram of an interaction between a computer-controlled machine and a control system, according to an embodiment.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include microphone, video, radar, LiDAR, ultrasonic and motion sensors.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500. In an embodiment, the control system 502 may be further configured to compute actuator control commands 510 depending on the outputs of the models described herein. For example, the actuator control commands 510 can be computed based upon a predicted pleasantness of an unrated sound using the models described herein. In the case of a sound emitted from one or more devices being predicted to have a pleasantness rating below a threshold, the system can command the actuator to separate or organize the respective one or more devices.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine-learning algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to the binary classification model) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more machine-learning algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the machine-learning algorithms and/or methodologies as disclosed herein. Non-volatile storage 516 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
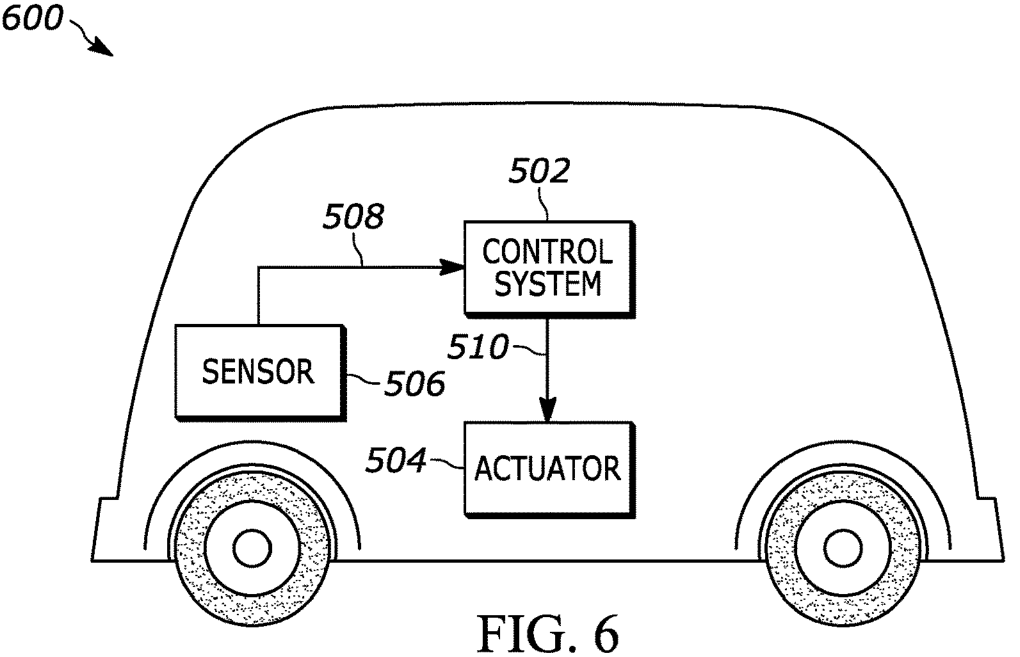
FIG. 6 depicts a schematic diagram of the control system of FIG. 5 configured to perform the pleasantness prediction methods disclosed herein with respect to a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control a vehicle 600, which may be an at least partially autonomous vehicle or an at least partially autonomous robot. Vehicle 600 includes actuator 504 and sensor 506. Sensor 506 may include one or more microphones, video sensors, cameras, radar sensors, ultrasonic sensors, LiDAR sensors, and/or position sensors (e.g. GPS). One or more of the one or more specific sensors may be integrated into vehicle 600, or a part of the vehicle.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects. The teachings herein can be applied to this particular embodiment wherein the image data associated with the images captured by the camera can lead to a predicted pleasantness rating of those images. Scenes captured by the vehicle can then be predicted to be pleasant (e.g., driving on a rolling countryside) or not pleasant (e.g., stuck in traffic).

In other embodiments where vehicle 600 is an at least partially autonomous robot, vehicle 600 may be a mobile robot that is configured to carry out one or more functions, such as flying, swimming, diving and stepping. Sounds may be emitted from these devices that are predicted to be pleasant or not pleasant, according to the teachings herein. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may make movements or sounds that are more pleasant based on the predicted pleasantness of such movement or sounds.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be a microphone configured to detect a sound emitted by the household appliance. For example, in the case of the domestic appliance being a washing machine, sensor 506 may detect noises associated with the operation of the washing machine, wherein the predicted pleasantness of that sound can be determined based on the methods described herein. Such an operation may involve external servers not local to the household or appliance. The server can then send a signal to the washing machine to cease operation, or send a signal to the appliance manufacturer or manager that the appliance may be in need of repair based upon the unpleasant sound being emitted.

Figure 7:
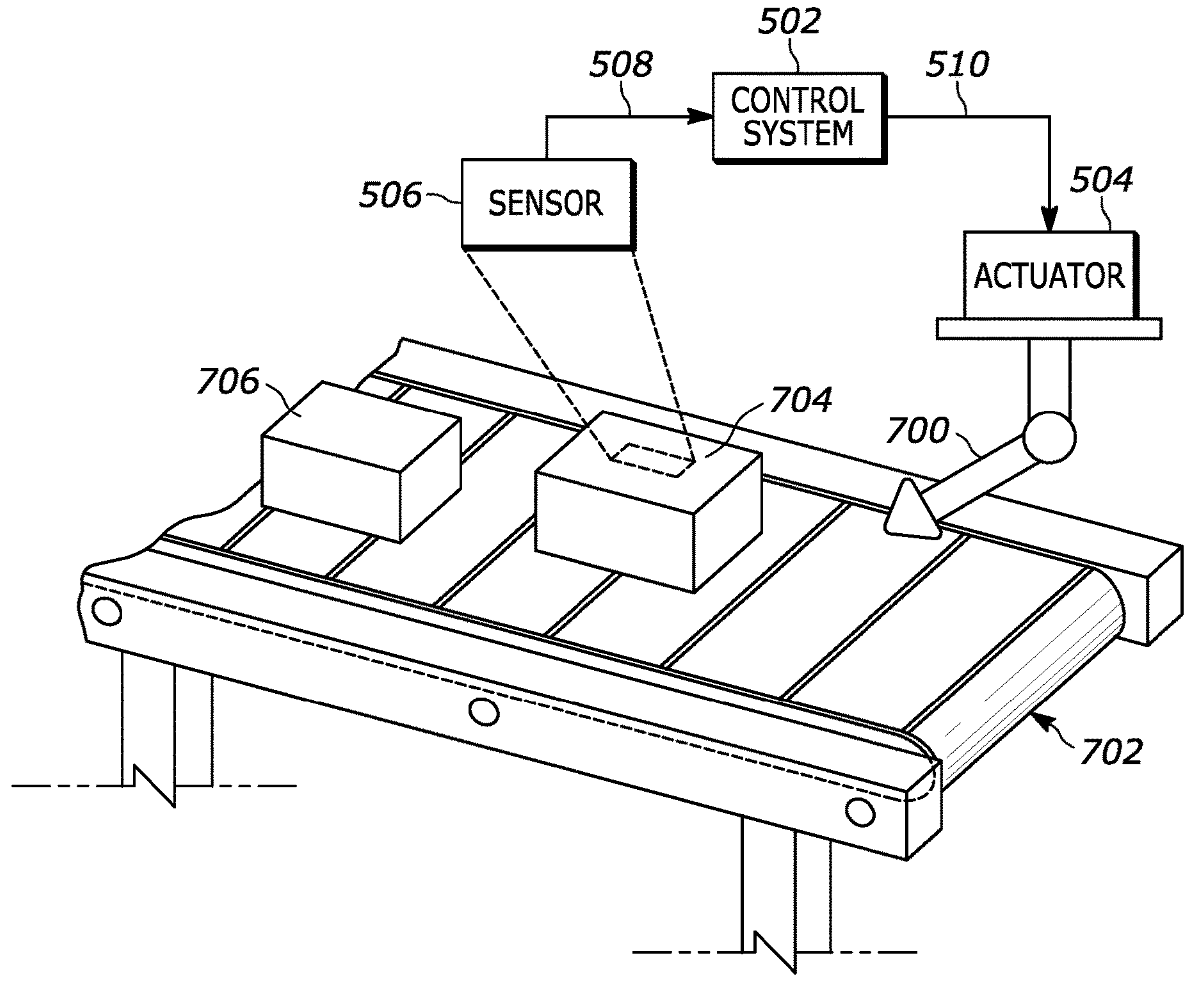
FIG. 7 depicts a schematic diagram of the control system of FIG. 5 configured to perform the pleasantness prediction methods disclosed herein with respect to a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to classify the pleasantness of an image captured by the optical sensor. Actuator 504 may be configured to control system 700 (e.g., manufacturing machine) depending on the predicted pleasantness of the manufactured product 704. The actuator 504 may be configured to control functions of system 700 (e.g., manufacturing machine) on subsequent manufactured product 706 of system 700 (e.g., manufacturing machine) depending on the predicted pleasantness of the manufactured product 704.

Figure 8:
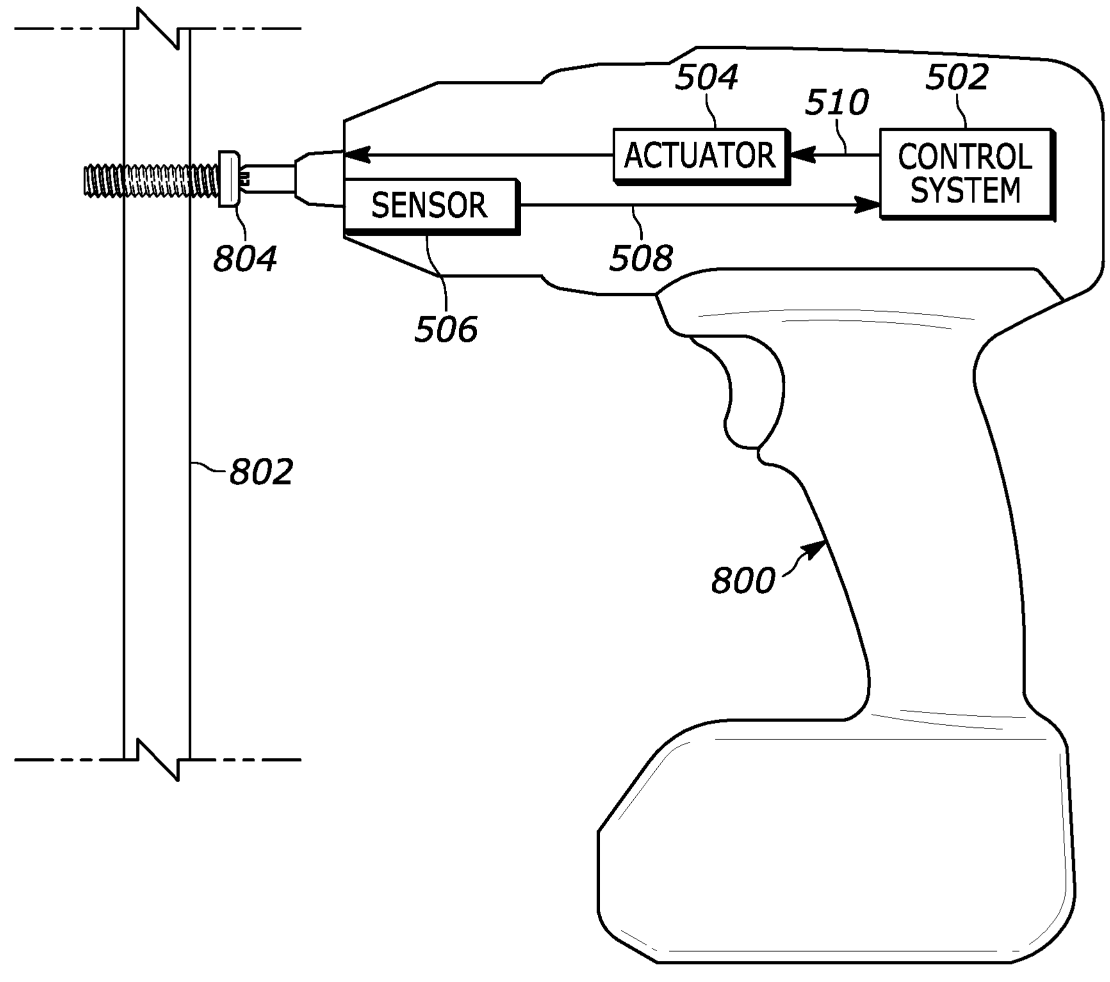
FIG. 8 depicts a schematic diagram of the control system of FIG. 5 configured to perform the pleasantness prediction methods disclosed herein with respect to a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be a microphone configured to capture one or more sounds when the tool is operated on a work surface 802 and/or fastener 804 being driven into work surface 802. Classifier 514 may be configured to classify or predict the pleasantness of such sounds. This can better inform the manufacturer of the power tool 800 as to whether the product will make pleasant sounds while working on various surfaces or fasteners. This can remove the need for juries of humans to listen to various tools work on various surfaces or fasteners, which could be an endless task. Actuator 504 may be configured to control power tool 800 such that the driving function of power tool 800 is adjusted depending on the predicted sound pleasantness. For example, actuator 504 may discontinue the driving function if the predicted sound pleasantness indicates a state of fastener 804 is not flush relative to work surface 802, for example. As another non-limiting example, actuator 504 may apply additional or less torque depending on the hardness of work surface 802.

Figure 9:
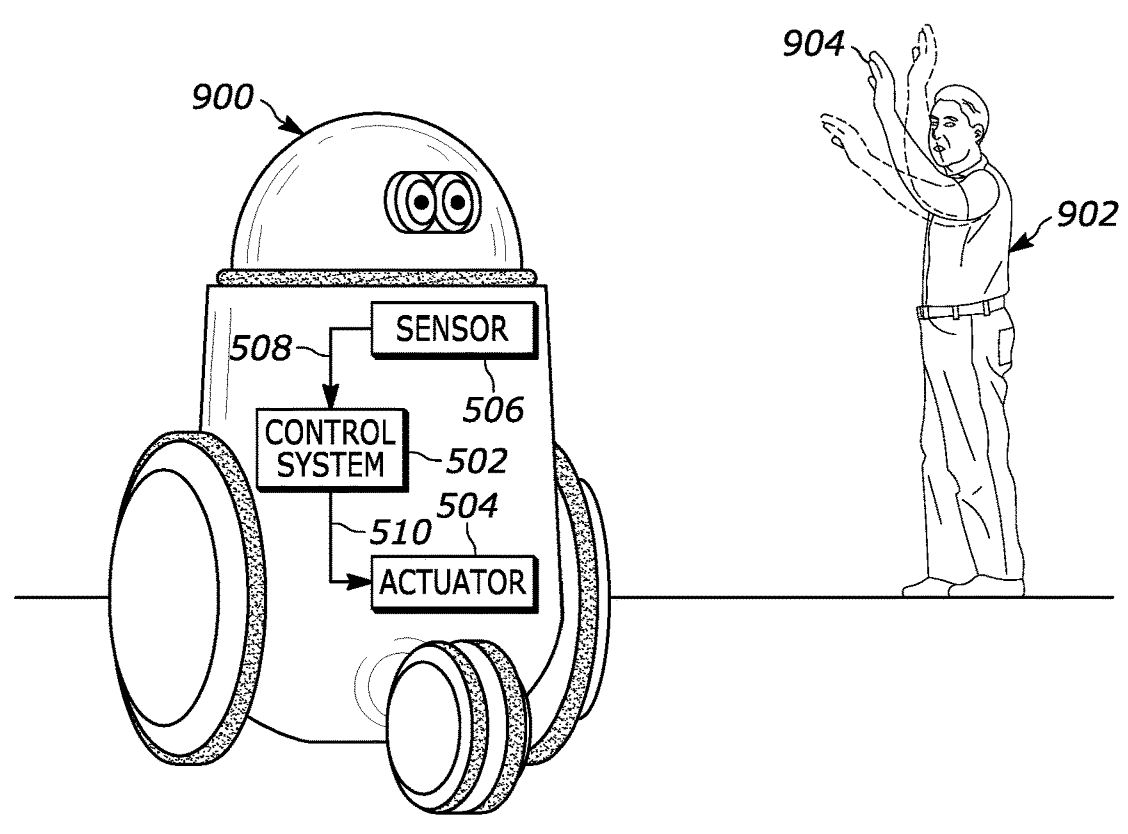
FIG. 9 depicts a schematic diagram of the control system of FIG. 5 configured to perform the pleasantness prediction methods disclosed herein with respect to an automated personal assistant.

FIG. 9 depicts a schematic diagram of control system 502 configured to control automated personal assistant 900. The sensor 506 may be a microphone or a camera, and sounds or images captured by the personal assistant 900 can be delivered (e.g., via wireless signals) to a system that predicts the pleasantness of the captured images or sounds, according to the teachings herein.

Figure 10:
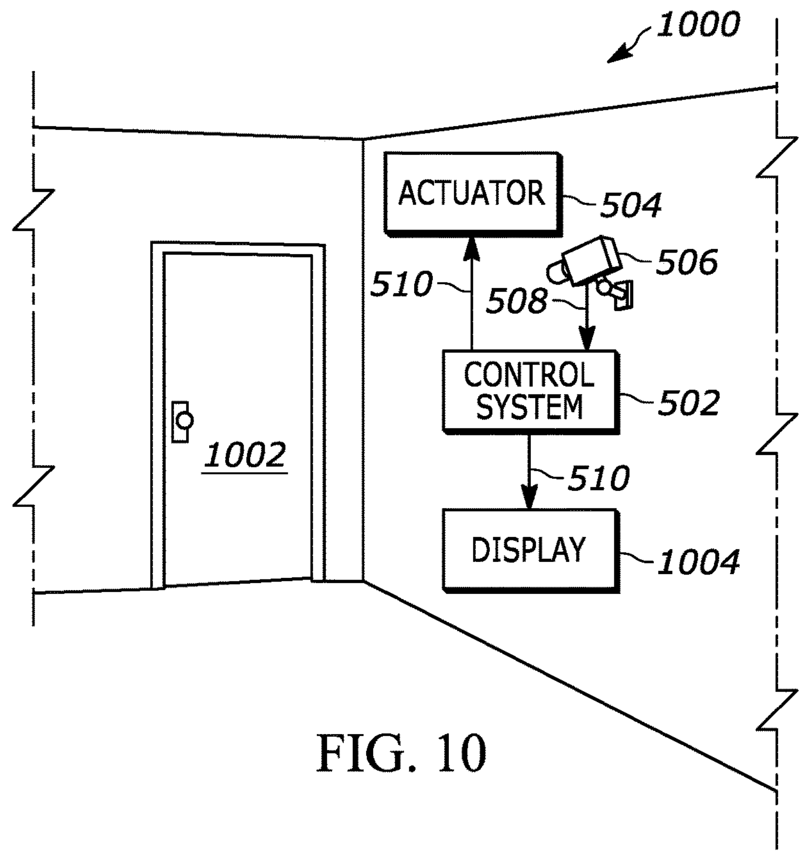
FIG. 10 depicts a schematic diagram of the control system of FIG. 5 configured to perform the pleasantness prediction methods disclosed herein with respect to a monitoring system, such as a control access system or a surveillance system.

FIG. 10 depicts a schematic diagram of control system 502 configured to control monitoring system 1000. In one embodiment, the monitoring system 1000 may be configured to physically control access through door 1002 based on images captured by the sensor 506, e.g., a camera, or display the captured images on a display 1004. Control of the door 1002 may be granted or denied based upon, for example, the predicted pleasantness of one or more objects captured by the camera.

Figure 11:
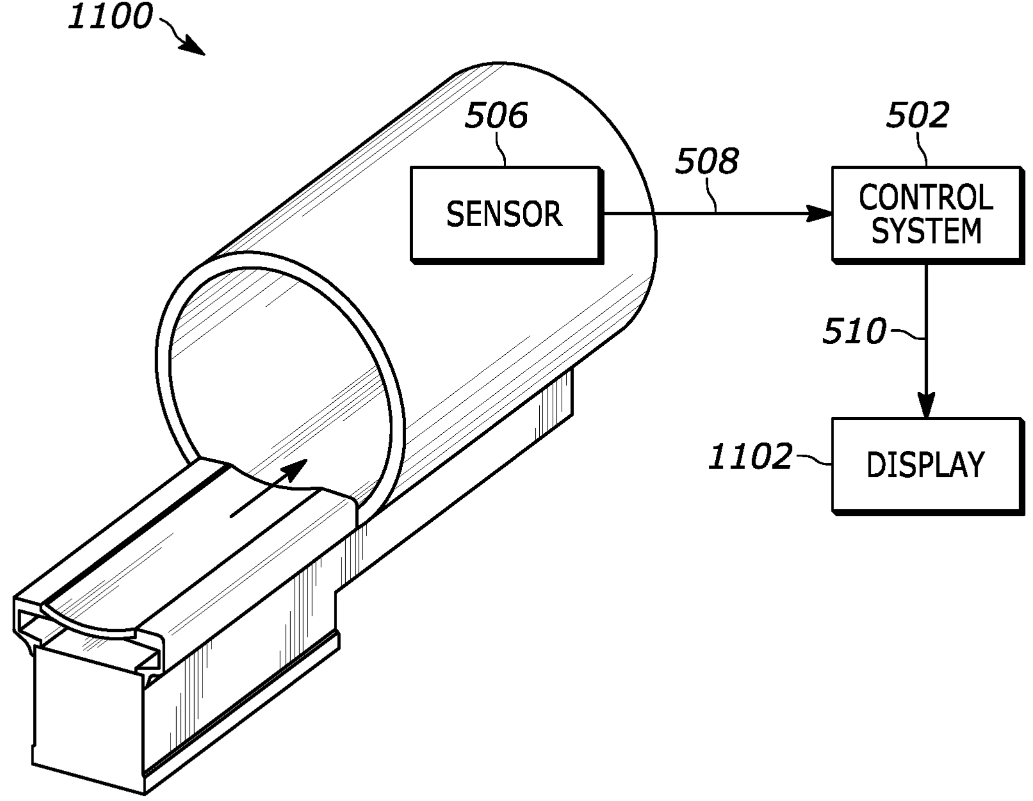
FIG. 11 depicts a schematic diagram of the control system of FIG. 5 configured to perform the pleasantness prediction methods disclosed herein with respect to an imaging system, for example an MRI apparatus, x-ray imaging apparatus or ultrasonic apparatus.

FIG. 11 depicts a schematic diagram of control system 502 configured to control imaging system 1100 displaying images on a display 1102, for example an Mill apparatus, x-ray imaging apparatus or ultrasonic apparatus. Sensor 506 may, for example, a microphone attached to the imaging system, wherein the system predicts a pleasantness of a sound emitted by the imaging apparatus. This can lead to a better experience in a doctor office, for example.

It should be understood that while this disclosure provides comparing sound quality measurements (e.g., loudness, tonality, sharpness) associated with one sound with sound quality measurements of another sound, this should not be limited to only sound measurements. Other non-sound measurements that are nonetheless associated with sound can be compared with the models and algorithms described herein. In other words, measurement associated with the sound need not be qualities of the sound itself. Instead, the measurements can be non-sound measurements such as vibration or voltage, as these qualities may also cause or impact the sound perceived by the persons. Measured vibration characteristics (e.g., using an accelerometer) and voltage characteristics (e.g., using a voltmeter or digital multimeter) can be inputs into the machine-learning models described herein, where the machine-learning models can compare vibration or voltage characteristics associated with a sound of a component with vibrational or voltage characteristics associated with another sound in pairwise comparisons. It should therefore be understood that references to qualities of sound can include non-sound measurements (such as vibration or voltage) which are not direct sound qualities but nonetheless can be associated with sound. One example of this is a motor. When the motor is vibrating at a certain magnitude or phase, it may be associated with a sound that it perceived to be unpleasant, and the perceived pleasantness of that sound can change as the vibration characteristics change.

Furthermore, it should be understood that the teachings provided herein are not limited to only sound. In addition to acoustic regression problems, the presented approach can also be applied to other kinds of regression problems that are based on the evaluation of sensor data. Examples for this include the determination of the error probability of a production process as a function of a measured current signal, voltage signal, vibration signal, etc. The teachings herein can be applied to non-sound environments in which the overall human-perceived, subjective qualities of a device (e.g., visual pleasantness, user-friendliness, workability, smell, etc.) can be predicted by first training a machine learning model with pairwise comparisons of its measureable qualities, and then using a regression task that compares the measurable qualities of the device with those that are already known from training. Compared to state of the art methods, the presented approach has advantages particularly if a small amount of training data is available.

For example, in addition to the acoustic optimization of products, the present disclosure can also be applied to other regression problems, which are based on the evaluation of sensor or image data. For example, a jury may be tasked with assigning a friendliness score to a facial expression as seen in a photograph of a person. Thereafter, the models can be trained with the image data (e.g., as captured from a camera or other image sensor and pre-processed) corresponding to the friendliness score, and the regression tasks and pairwise comparisons can be made with a new image that has not been rated by a jury. The teachings herein can also be provided for the determination of the failure probability of a production process as a function of a measured current signal or recorded sound or image, or the evaluation of the seriousness from the audio recording of a spoken sentence.

The systems and methods disclosed herein offer a novel way to tackle regression tasks using machine learning methods, with advantages particularly in cases where the input data is low-dimensional and the amount of available training data is small. The systems and methods can also be used for detecting anomalies, if characteristic low-dimensional quantities (e.g. currents, press-fit forces, . . . ) and anomaly criteria on a continuous scale are available. This could for example be the case in the manufacturing process of technical components or systems. Compared to state of the art methods, the presented approach has advantages particularly if a small amount of training data is available.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of controlling operation of a device based on a predicted pleasantness of a sound emitted by the device utilizing machine learning, the method comprising:

receiving a plurality of pleasantness ratings from one or more human jurors, each pleasantness rating corresponding to a respective one of a plurality of sounds emitted by one or more devices;

detecting, via a microphone system, a plurality of measurable sound qualities, each measurable sound quality associated with a respective one of the plurality of sounds;

training a regression prediction model based on, for each respective sound, its pleasantness rating and its corresponding measurable sound quality until convergence yields a trained regression prediction model, wherein the training of the regression prediction model uses differences determined, via pairwise comparisons, between each of the plurality of pleasantness ratings and every other of the plurality of pleasantness ratings as inputs;

detecting, via the microphone system, a measurable sound quality of an unrated sound, wherein the unrated sound has not been rated by the one or more human jurors;

executing the trained regression prediction model on the measurable sound quality of the unrated sound to yield a plurality of predicted pleasantness difference ratings, each predicted pleasantness difference rating corresponding to a respective pairwise comparison between the unrated sound and a respective one of the plurality of sounds;

for each pairwise comparison, combining the predicted pleasantness difference rating with a respective one of the pleasantness ratings to yield a respective summed rating;

outputting an overall predicted pleasantness rating of the unrated sound based upon a weighted average of the summed ratings;

generating actuator control commands based upon the overall predicted pleasantness rating of the unrated sound; and transmitting the actuator control commands to an actuator to change operation of the device when the overall predicted pleasantness rating of the unrated sound is below a threshold.

2. The method of claim 1, wherein the plurality of measurable sound qualities includes at least one of loudness, tonality, and sharpness.

3. The method of claim 1, further comprising:

determining, via pairwise comparisons, differences between each of the plurality of pleasantness ratings and every other of the plurality of pleasantness ratings;

wherein the training of the regression prediction model uses the differences as inputs.

4. The method of claim 1, wherein the plurality of measurable sound qualities is on a temporal spectrum.

5. The method of claim 1, wherein the plurality of measurable sound qualities is input into the regression prediction model in a two-dimensional spectra.

6. A system for controlling operation of a device based on a predicted pleasantness of a sound emitted by the device utilizing machine learning, the system comprising:

a microphone configured to detect a plurality of sounds emitted by one or more devices;

a processor programmed to process the plurality of sounds; and a memory storing instructions that, when executed by the processor, cause the processor to:

receive a plurality of pleasantness ratings from one or more human jurors, each pleasantness rating corresponding to a respective one of the plurality of sounds, detect a plurality of measurable sound qualities, each measurable sound quality associated with a respective one of the plurality of sounds detected by the microphone, train a regression prediction model based on, for each respective sound, its pleasantness rating and its corresponding measurable sound quality until convergence yields a trained regression prediction model, wherein the training of the regression prediction model uses differences determined, via pairwise comparisons, between each of the plurality of pleasantness ratings and every other of the plurality of pleasantness ratings as inputs, detect a measurable sound quality of an unrated sound, wherein the unrated sound has not been rated by the one or more jurors, execute the trained regression prediction model on the measurable sound quality of the unrated sound to yield a plurality of predicted pleasantness difference ratings, each predicted pleasantness difference rating corresponding to a respective pairwise comparison between unrated sound and a respective one of the plurality of sounds, for each pairwise comparison, combine the predicted pleasantness difference rating with a respective one of the pleasantness ratings to yield a respective summed rating;

output an overall predicted pleasantness rating of the unrated sound based upon a weighted average of the summed ratings;

generate actuator control commands based upon the overall predicted pleasantness rating of the unrated sound; and transmit the actuator control commands to an actuator to change operation of the device when the overall predicted pleasantness rating of the unrated sound is below a threshold.

7. The system of claim 6, wherein the plurality of measurable sound qualities includes at least one of loudness, tonality, and sharpness.

8. The system of claim 6, wherein the memory includes further instructions that, when executed by the processor, cause the processor to:

determine, via pairwise comparisons, differences between each of the plurality of pleasantness ratings and every other of the plurality of pleasantness ratings;

wherein the training of the regression prediction model uses the differences as inputs.

9. The system of claim 6, wherein the plurality of measurable sound qualities is on a temporal spectrum.

10. The system of claim 6, wherein the plurality of measurable sound qualities is input into the regression prediction model in a two-dimensional spectra.

11. A method of controlling operation of a device based on a predicted pleasantness of a sound emitted by the device utilizing machine learning, the method comprising:

receiving a plurality of pleasantness ratings from one or more human jurors, each pleasantness rating corresponding to a respective one of a plurality of sounds emitted by one or more devices;

detecting, via a microphone system, a plurality of measurable sound qualities, each measurable sound quality associated with a respective one of the plurality of sounds;

detecting, via the microphone system, a measurable sound quality of an unrated sound, wherein the unrated sound has not been rated by the one or more human jurors;

executing a regression prediction model on the measurable sound quality of the unrated sound to yield a plurality of predicted pleasantness difference ratings, each predicted pleasantness difference rating corresponding to a respective pairwise comparison between the unrated sound and a respective one of the plurality of sounds;

for each pairwise comparison, combining the predicted pleasantness difference rating with a respective one of the pleasantness ratings to yield a respective summed rating; and outputting an overall predicted pleasantness rating of the unrated sound based upon an average of the summed ratings;

generating actuator control commands based upon the overall predicted pleasantness rating of the unrated sound; and transmitting the actuator control commands to an actuator to change operation of the device when the overall predicted pleasantness rating of the unrated sound is below the threshold.

12. The method of claim 11, wherein the plurality of measurable sound qualities includes at least one of loudness, tonality, and sharpness.

13. The method of claim 11, wherein the overall predicted pleasantness rating of the unrated sound is based upon a weighted average of the summed ratings.

14. The method of claim 11, wherein the plurality of measurable sound qualities is on a temporal spectrum, or is input into the regression prediction model in a two-dimensional spectra.

* * * * *